April 24, 1956     J. P. ROBERTSON     2,743,027
LOAD ELEVATING AND TRANSPORTING ATTACHMENT FOR TRACTORS
Filed March 12, 1951     3 Sheets-Sheet 1
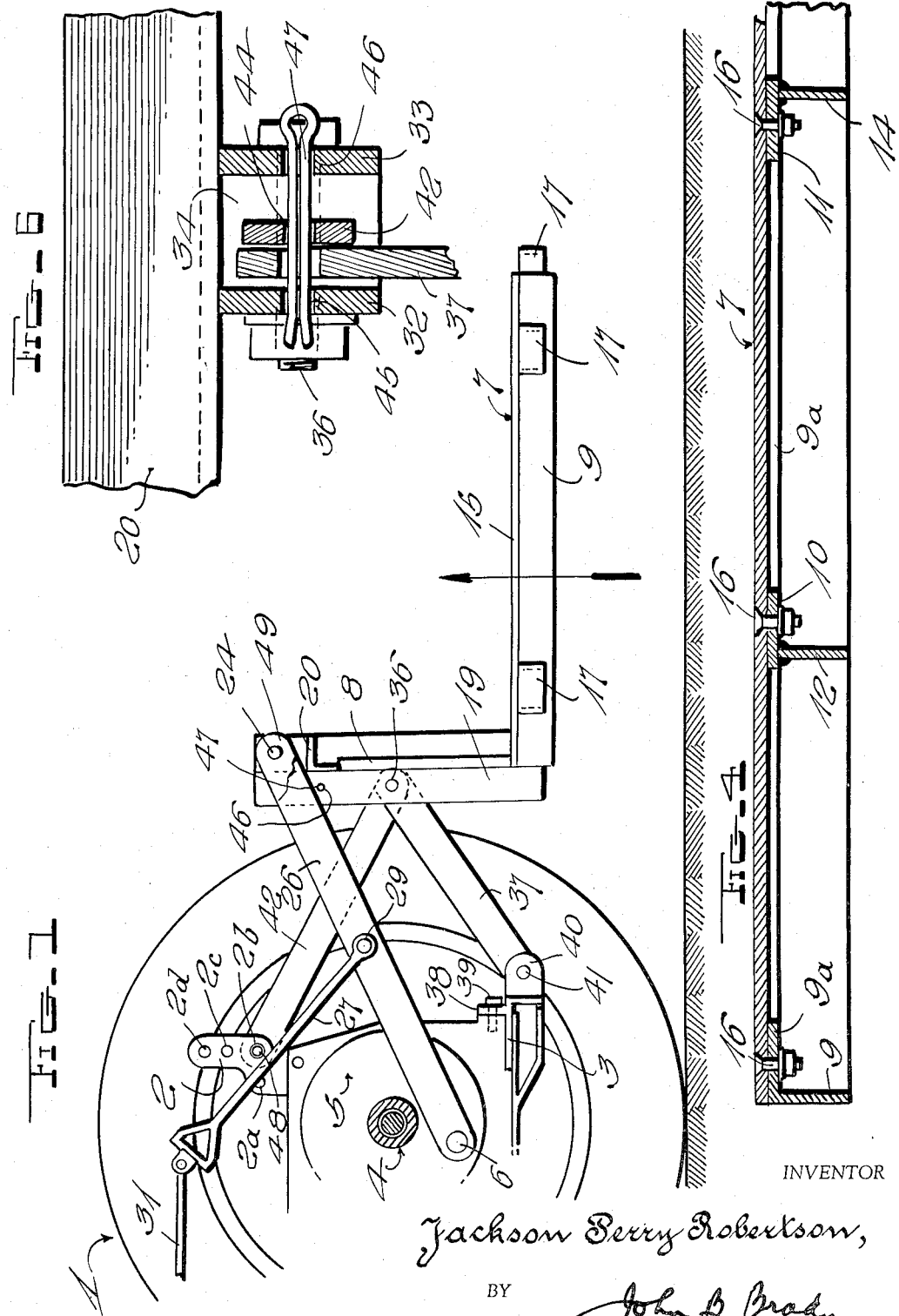
INVENTOR
Jackson Perry Robertson,
BY
John B. Brady
ATTORNEY

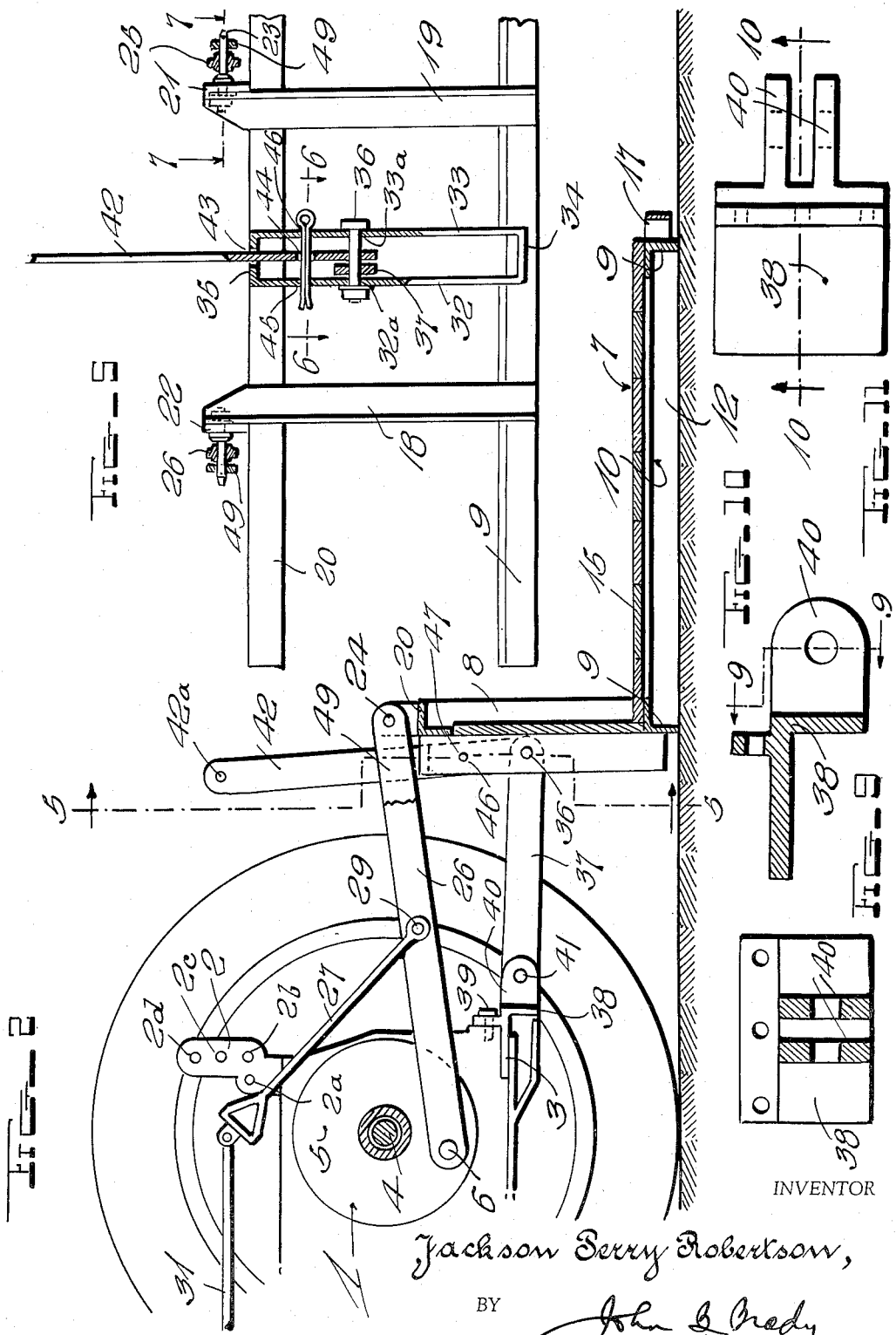

April 24, 1956   J. P. ROBERTSON   2,743,027
LOAD ELEVATING AND TRANSPORTING ATTACHMENT FOR TRACTORS
Filed March 12, 1951   3 Sheets-Sheet 3
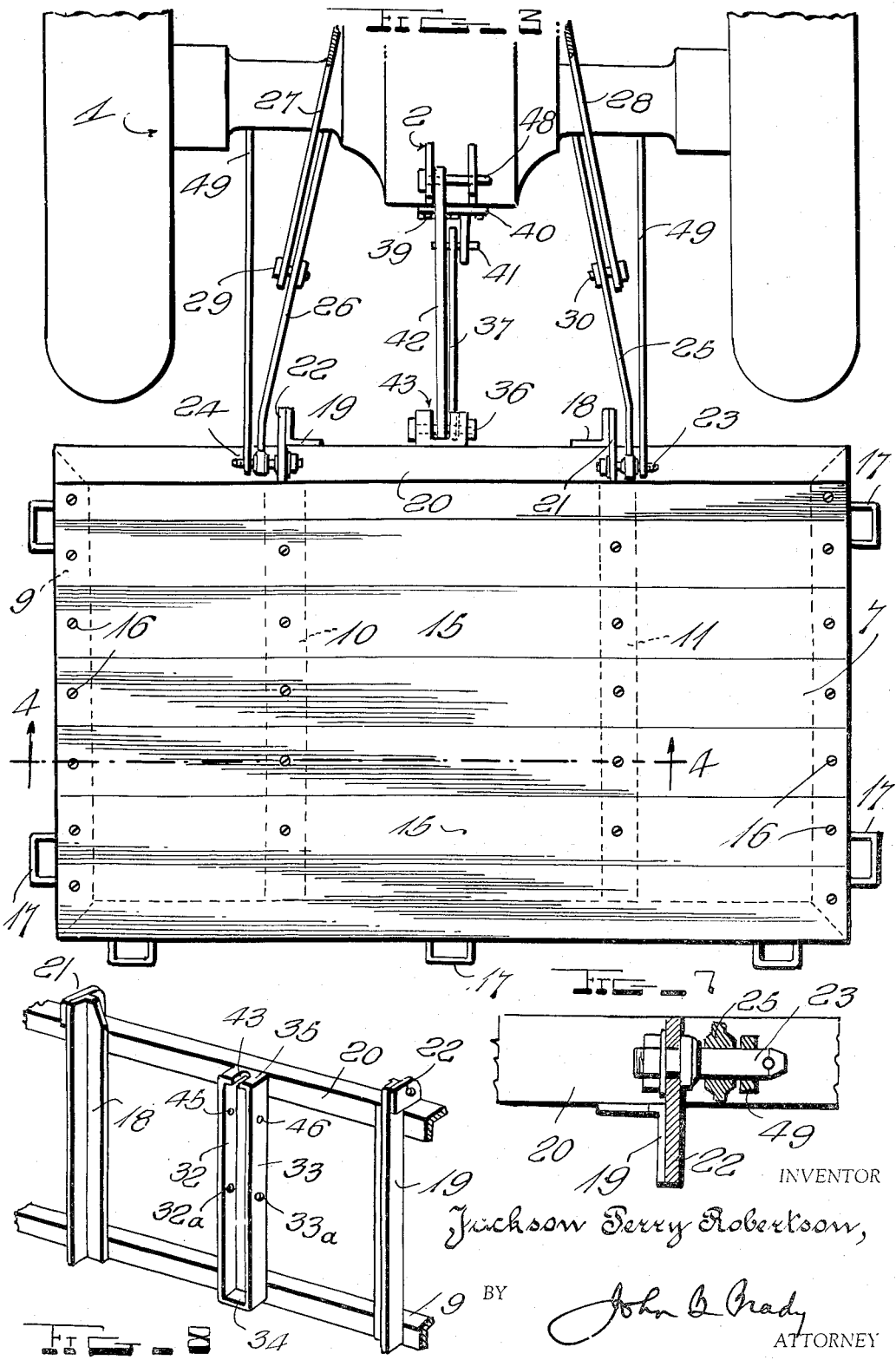
INVENTOR
Jackson Perry Robertson,
BY John A. Grady
ATTORNEY United States Patent Office 2,743,027
Patented Apr. 24, 1956

2,743,027

LOAD ELEVATING AND TRANSPORTING ATTACHMENT FOR TRACTORS

Jackson Perry Robertson, Columbus, Miss.

Application March 12, 1951, Serial No. 215,080

4 Claims. (Cl. 214—130)

My invention relates broadly to attachments for tractors and more particularly to a load elevating and transporting attachment for tractors.

One of the objects of my invention is to provide a construction of hydraulically operated load elevating and transporting attachment for tractors including a mechanical linkage for locking the attachment in raised position and relieving the hydraulic system of the tractor from stress and strain.

Another object of my invention is to provide an arrangement of load elevating and transporting attachment for tractors which may be hydraulically controlled from the tractor or the hydraulic control locked out after elevating the load to transporting position and the attachment locked in transporting position for eliminating all possibility of injuring the tractor hydraulic system under conditions of heavy loads or sway during transportation over rough terrain.

Still another object of my invention is to provide a sturdy and reliable construction of load elevating and transporting attachment for tractors including means for stabilizing the attachment with respect to the tractor and so distributing stresses encountered under load elevating and transporting conditions that appreciable swaying of the attachment or the transmission of reactionary forces to the hydraulic system of the tractor are substantially eliminated.

Other and further objects of my invention reside in the improved construction of load elevating and transporting attachment for tractors as set forth more fully in the specification hereinafter following by reference to the accompanying drawings in which:

Figure 1 is a side elevational view of the load elevating and transporting attachment for tractors illustrated in locked elevated position with stresses and strains on the hydraulic system of the tractor wholly eliminated; Fig. 2 is a view similar to the view shown in Fig. 1 but illustrating the tractor attachment lowered to a position for loading and elevating under control of the hydraulic system of the tractor and prior to the movement of the attachment to elevated position and the locking thereof in elevated position; Fig. 3 is a top plan view of the attachment of my invention assembled with respect to a tractor and illustrated in load transporting position with the locking means in position for relieving stresses and strains from the hydraulic system of the tractor during operation under load; Fig. 4 is a vertical sectional view through a fragmentary portion of the load elevating and transporting platform of the attachment of my invention taken on line 4—4 of Fig. 3; Fig. 5 is a fragmentary vertical sectional view taken substantially on line 5—5 of Fig. 2 with certain of the parts broken away and shown in section to illustrate more particularly how the locking means is locked out of engagement with the tractor while the hydraulic lift mechanism of the tractor is being utilized for controlling the elevating or lowering of the attachment; Fig. 6 is a horizontal sectional view taken substantially on line 6—6 of Fig. 5, the view being shown on an enlarged scale for illustrating the manner of maintaining the locking means out of engagement with the tractor while the hydraulic lift mechanism of the tractor is being utilized for controlling the elevating and lowering of the attachment; Fig. 7 is a fragmentary sectional view taken on line 7—7 of Fig. 5, the view being shown on enlarged scale to illustrate more particularly the means for connecting the attachment to the tractor; Fig. 8 is a perspective view looking at the rear of the attachment of my invention and showing more particularly the arrangement of parallel bars between which the tractor attachment means are pivoted and with respect to which the locking bar may be latched when the attachment is being operated under control of the hydraulic lift mechanism of the tractor; Fig. 9 is a vertical sectional view taken on line 9—9 of Fig. 10 through the tow bar attaching bracket which interconnects the attachment of my invention with the tractor; Fig. 10 is a longitudinal sectional view taken on line 10—10 of Fig. 11 showing the structure of the tow bar attaching bracket and Fig. 11 is a top plan view of the tow bar attaching bracket shown in Figs. 9 and 10.

My invention is directed to a load elevating and transporting attachment for tractors which is sturdy and reliable in construction and which may be manufactured inexpensively on a mass production scale. The load elevating and transporting attachment of my invention is especially constructed to eliminate undue strains on the hydraulic system of the tractor so that the hydraulic lift mechanism of the tractor may be utilized simply for elevating and lowering the attachment while all stresses and strains thereon are eliminated during transportation by positively locking the attachment with respect to the tractor. The locking means provided on the attachment of my invention is normally latched out of engagement with the tractor during the time that the hydraulic lift mechanism on the tractor is being employed for elevating or lowering the attachment. When the attachment has been elevated to transporting position the locking means is unlatched from the attachment and connected with the tractor for forming a substantially braced and rigid connection between the tractor and the attachment wholly relieving the hydraulic lift mechanism from any stress or strain which would otherwise exist where it is necessary to transport a load with the attachment maintained in elevated position under control of the hydraulic lift mechanism. In the structure of my invention the attachment is maintained in elevated position independently of the hydraulic lift mechanism on the tractor. That is to say, after the hydraulic lift mechanism on the tractor is operated to elevate the attachment to transporting position the hydraulic lift mechanism is decommissioned insofar as maintenance of the attachment in elevated position during the transportation period is concerned and the attachment is positively locked in elevated position throughout the transportation period. Such an arrangement is particularly effective under conditions of heavy loads and conditions encountered in the swaying of loads during transportation over rough terrain. The hydraulic system of the tractor is thus protected against any possibility of injury due to excessive stresses.

Referring to the drawings in more detail reference character 1 designates a conventional tractor having connection means thereon including the top link anchor bracket 2 and the tow bar attaching bracket 3. The top link anchor bracket 2 is disposed above the rear axle 4 of the tractor and is displaced rearwardly from a vertical plane 5 passing through the rear axle 4 of the tractor. The tow bar attaching bracket 3 is disposed below rear axle 4 and is displaced rearwardly from the plane 5 passing through rear axle 4 at a greater distance from the plane 5 than is the top link anchor bracket 2. Stud bolt 6 is attached to the tractor frame forwardly of a plane extending through rear axle 4 and in a position below rear axle 4. It will be understood that while I have described the top link anchor bracket 2 and the tow bar attaching bracket 3 and the stud bolts 6 at one side of the tractor, a similar distribution of these same elements is provided at the other side of the tractor frame so that the arrangement at each side of the tractor frame is symmetrical as will be more clearly seen in Fig. 3.

The attachment of my invention comprises the load elevating and transporting platform 7 shown more particularly in Figs. 1–4 connected at the front thereof by a vertically extending frame structure shown generally at 8 and illustrated more clearly in Figs. 5 and 8. The load transporting platform 7 comprises a horizontally disposed angle frame 9 consisting of a peripheral angle frame terminating in downwardly depending flanges interconnected by horizontally extending flanges represented at 9a. The peripheral angle frame is reinforced transversely thereof by transverse plates 10 and 11 welded to vertically disposed strips 12 and 14 which connect at the opposite ends with the vertical flanges of the angle members constituting the peripheral frame 9. The platform 7 is formed by a substantial wood floor 15 constituted by strips extending longitudinally of the platform and secured in position by bolts 16 extending through the horizontally extending flange 9a of the angle members 9 and the transverse plates 10 and 11. The platform 7 is provided with suitable brackets 17 at spaced intervals around the peripheral edges of the vertical flanges 9 of the peripheral angle frame of the platform to provide means for insertion of appropriate stakes for maintaining the load in stacked position on the platform.

The angle member 9 at the forward end of the platform provides a connection means for the frame structure 8 constituting the front wall of the platform. This frame structure consists of vertically extending angle members 18 and 19 welded at their lower ends to the exterior vertical flange of the front angle member 9 and welded at their upper extremities to the horizontally extending angle member 20. The angle member 20 and the vertically extending angle members 18 and 19 are further interconnected by the horizontally extending plates 21 and 22 welded both to the angle member 20 and the angle members 18 and 19. The plates 21 and 22 carry outwardly extending horizontally disposed draft pins 23 and 24 which serve as the connection means to the lift bars 25 and 26 which extend from the studs 6 on the tractor frame to the draft pins 23 and 24.

The bars 25 and 26 are angularly movable about stud bolt 6 as centers for permitting raising and lowering of the attachment under control of the connecting bars 27 and 28 extending from pivotal connections 29 and 30 with lift bars 25 and 26 to the hydraulic lift mechanism of the tractor connected through links designated at 31 in Figs. 1 and 2 leading to the hydraulic lift mechanism on the tractor. I provide a stabilizer bar 49 extending from a pivotal point on the frame of the tractor 1 to the draft pin 23 for laterally stabilizing the attachment throughout its path of adjustment.

The front of the vertically extending frame structure 8 of the attachment is provided at its central portion with a pair of parallel extending bars shown at 32 and 33 which are maintained in fixed spacial relation by means of transversely extending members 34 and 35 at the top and bottom of the parallel extending bars 32 and 33. Thus the bars 32 and 33 form rigid reinforcement means for the vertically extending frame structure 8 and project for distances substantially coplanar with the limits of the forwardly extending flanges of angle members 18 and 19 and also form a housing for receiving the locking bar 42 in its detached position as will be hereinafter explained. The bars 32 and 33 are apertured at 32a and 33a to provide a passage for a bolt member 36 to which pivotal connection of the position equalizing bar 37 is made.

The other end of the position equalizing bar 37 is pivotally connected to the equalizing bar bracket 38 which is secured to the frame of the tractor by suitable attachment bolts 39 and which is provided with a co-extensive tow bar attaching bracket 40. A pivotal connection indicated at 41 is provided between the tow bar attaching bracket 40 and the position equalizing bar 37. Thus the vertically extending frame structure 8 is enabled to be raised and lowered with position equalizing bar 37 forming a radius and the lift bars 25 and 26 operating as elevating and lowering means for the attachment under control of the hydraulic lift mechanism operating through connecting bars 27 and 28. The raising and lowering of the attachment under control of the hydraulic lift mechanism is automatically accomplished by operation of the hydraulic lift mechanism on the tractor. However, in order to relieve the hydraulic lift mechanism from abnormal stresses and strains, I provide the locking bar 42 which is pivotally connected with the bolt 36 immediately adjacent the position equalizing bar 37 and between the spaced parallel extending bars 32 and 33. The spaced parallel extending bars 32 and 33 which are connected at their tops by transversely extending member 35 serve as guide means for the locking bar 42. The transversely extending member 35 is slotted at 43 for permitting entry of the locking bar 42, when the locking bar 42 is raised to vertical position illustrated in Figs. 2, 5 and 6. When the locking bar is raised to vertical position the aperture 44 therein is aligned with apertures 45 and 46 in spaced bars 32 and 33 to permit the passage of the pin 47 which extends through apertures 45, 46 and 44 for maintaining locking bar 42 in the vertical position shown in Figs. 2, 5 and 6. When the locking bar 42 is in this position the hydraulic lift mechanism of the tractor controls the elevating and lowering of the attachment with the load carried on platform 7. When, however, it is desired to relieve the hydraulic mechanism from any strain due to mass of the load, load sway during transportation and transportation over rough terrain the pin 47 is removed from the aligned apertures 45, 44 and 46 freeing the locking bar 42 and enabling the locking bar 42 to be angularly shifted about transverse pin 36 as a center and connected to any one of the spaced apertures indicated at 2a, 2b, 2c and 2d in the top bracket 2 by means of the anchor pin 48 which passes transversely through aperture 42a in the end of locking bar 42. Thus locking bar 42 may be rendered effective or ineffective and while effective will relieve the hydraulic lift mechanism of the tractor from undue stresses and strains.

With the locking bar 42 in substantially vertical position within the housing formed by bars 32 and 33 and transversely extending members 34 and 35 as indicated in Fig. 2 and platform 7 in position for receiving a load, the platform may be loaded and then raised under control of the hydraulic lift to the position illustrated in Fig. 1. At this time the locking bar 42 may be moved from the substantially vertical position illustrated in Figs. 2, 5 and 6 to the locking position illustrated in Fig. 1 with the anchor pin 48 extending through the selected one of the spaced apertures 2a, 2b, 2c or 2d in the top bracket 2 for locking the attachment in the elevated position so that the load is carried without strain upon the hydraulic system of the tractor.

The structure set forth herein has been found to be highly practical and successful in operation but I realize that modifications may be made and I desire that it be understood that no limitations upon my invention are intended other than may be imposed by the scope of the appended claims.

What I claim as new and desire to secure by Letters Patent of the United States is as follows:

1. In an elevating and transporting attachment for tractors which includes a displaceable load carrying platform and vertically disposed frame structure extending along one edge thereof, a vertically extending housing mounted centrally of the rear of said frame structure, said housing comprising a pair of parallel extending spaced frame members, transverse members forming cross connections for said frame members at opposite ends thereof, one of said transverse members being centrally slotted intermediate said spaced frame members for receiving a locking bar, a pivot mounting formed between said spaced frame members in a position intermediate said transverse members, and a locking bar journaled on said pivot mounting and movable from a position housed between said pair of parallel extending spaced frame members to a position extending in an angular direction with respect to the plane of said housing for bracing and reinforcing said load carrying platform.

2. An elevating and transporting attachment for tractors as set forth in claim 1 wherein said parallel extending spaced frame members are apertured in a position displaced from said pivot mounting, said locking bar having a perforation therein alignable with the apertured frame members when the locking bar is displaced to a position substantially coplanar with the plane of the vertically displaced frame structure attached to said load carrying platform, and means detachably engageable through the apertured spaced frame members and the perforation in said locking bar for maintaining said locking bar in coplanar alignment with said vertically disposed frame structure.

3. An elevating and transporting attachment for tractors as set forth in claim 1 wherein said parallel extending spaced frame members are apertured in a position intermediate the slotted transverse member and said pivot mounting, said locking bar having a perforation therein alignable with the apertured frame members when the locking bar is displaced to a position substantially coplanar with the plane of the vertically disposed frame structure attached to said load carrying platform, and means detachably engageable through the apertured spaced frame members and the perforation in said locking bar for maintaining said locking bar in coplanar alignment with said vertically disposed frame structure.

4. In an elevating and transporting attachment for tractors as set forth in claim 1 wherein said parallel extending spaced frame members are apertured in a position intermediate the slotted transverse member and said pivot mounting, said locking bar having a perforation therein alignable with the apertured frame members when the locking bar is displaced to a position substantially coplanar with the plane of the vertically disposed frame structure attached to said load carrying platform, and a transverse detachable pin insertable through the apertured spaced frame members and the perforation in said locking bar in a direction normal to the plane thereof for maintaining said locking bar in coplanar alignment with said vertically disposed frame structure.

References Cited in the file of this patent

UNITED STATES PATENTS

| Number | Name | Date |
|---|---|---|
| 1,677,618 | Clement | July 17, 1928 |
| 2,337,801 | Cook | Dec. 28, 1943 |
| 2,397,046 | Richey | Mar. 19, 1946 |
| 2,398,365 | Ellis | Apr. 16, 1946 |
| 2,446,584 | Green | Aug. 10, 1948 |
| 2,505,639 | Eaton | Apr. 25, 1950 |
| 2,510,179 | Johnson | June 6, 1950 |
| 2,524,048 | Furnas | Oct. 3, 1950 |
| 2,531,768 | Cline et al. | Nov. 28, 1950 |
| 2,554,900 | Davies | May 29, 1951 |
| 2,566,547 | Bartlett | Sept. 4, 1951 |